US006498887B1

(12) United States Patent
Gruner-Nielsen et al.

(10) Patent No.: US 6,498,887 B1
(45) Date of Patent: Dec. 24, 2002

(54) DISPERSION-COMPENSATING FIBER HAVING A HIGH RELATIVE DISPERSION SLOPE

(75) Inventors: Lars Gruner-Nielsen, Bronshoj (DK); Poul Kristensen, Valby (DK); Quang Nghi Trong Le, Rodovre (DK); Marie Wandel, Vanlose (DK)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/098,242

(22) Filed: Mar. 15, 2002

Related U.S. Application Data

(63) Continuation-in-part of application No. 09/790,105, filed on Feb. 21, 2001.

(51) Int. Cl.⁷ .................................................. G02B 6/10
(52) U.S. Cl. ...................................... 385/123; 385/124
(58) Field of Search ................................ 385/123, 124, 385/125, 126, 129, 130, 131, 132

(56) References Cited

U.S. PATENT DOCUMENTS

| | | | |
|---|---|---|---|
| 5,361,319 A | 11/1994 | Antos | 385/123 |
| 5,448,674 A | 9/1995 | Vengsarkar | 385/123 |
| 5,611,016 A | 3/1997 | Fangmann | 385/100 |
| 5,878,182 A | 3/1999 | Peckham | 385/123 |

OTHER PUBLICATIONS

U. S. Patent Application Ser. No. 09/790,105, Filed Feb. 21, 2001, "Dispersion–Compensating Fiber Having A High Figure of Merit".

A.E. Miller, et al.; *Ultranegative delta cladding for modified chemical vapor deposition*, OFC 96 Technical Digest, Feb. 25, 1996, at 56–58.

Lars Gruner–Nielson, et al.; *Design and manufacture of dispersion compensating fibre for simultaneous compensation of dispersion and dispersion slope*, OFC Technical Digest Mar. 1999.

Y. Akasaka, et al., *Dispersion Compensating Technique of 1300nm Zero–Dispersion SM Fiber To Get Flat Dispersion at 1550nm Range*, Proc. 21$^{st}$ Eur. Conf. on Opt. Comm., 1995, at 605–608.

Y. Akasaka, et al., *High–dispersion–compensation ability and low nonlinearity of W–shaped DCF*, OFS Technical Digest, 1996, at 201–202.

(List continued on next page.)

*Primary Examiner*—Frank G. Font
*Assistant Examiner*—Kaveh C Kianni
(74) *Attorney, Agent, or Firm*—Michael A. Morra

(57) ABSTRACT

Disclosed is a dispersion-compensating (DC) optical fiber 10 that is designed to support the fundamental mode of radiation at 1550 nm. The DC fiber is fabricated from silica glass and has a refractive index profile that includes a core region 51 surrounded by a cladding region 52 having a nominal refractive index $n_4$. The core region includes a central core 511 having a nominal refractive index $n_1$, a "trench" 512 surrounding the central core having a nominal refractive index $n_2$, and a "ridge" 513 surrounding the trench having a nominal refractive index $n_3$. A range of refractive index profiles has been found that provides relative dispersion slopes (RDS) that are greater than 0.012 $nm^{-1}$ and figures of merit that are greater than 200 ps/(nm·dB). The range is conveniently expressed in terms of index differences and radial dimensions:

central core: radius=1.5±0.5 $\mu m$, and $0.015<n_1-n_4<0.035$;
trench: width=4.3±1.0 $\mu m$, and $-0.012<n_2-n_4<-0.006$; and
ridge: width=2.4±1.0 $\mu m$; and $0.002<n_3-n_4<0.015$.

12 Claims, 5 Drawing Sheets

OTHER PUBLICATIONS

U.S. Patent Application Ser. No. 09/778,444, Filed Feb. 7, 2001, "Systems and Methods for Low–Loss Splicing of Optical Fibers Having A High Concentration of Fluorine to Other Types of Optical Fiber," Riis.

V. Srikant, *Broadband dispersion and dispersion slope compensation in high bit rate and ultra long haul systems*, Technical Digest OFC, 2001.

M.J. Li, *Recent Progress in Fiber Dispersion Compensators*, ECOC, Sep. 30, 2001.

U.S. Patent Application Ser. No. 09/634,966, Filed Aug. 9, 2000, "Raman–Amplified Optical Transmission System," A.F. Judy.

U.S. Patent Application Ser. No. 09/787,413, Filed Feb. 7, 2001, "Dispersion Compensating Fiber With Reduced Splice Loss and Methods for Making Same," Edvold.

U.S. Patent Application Ser. No. 09/634,966, Filed Aug. 9, 2000, A.F. Judy.

D.W. Hawtof, et al.; *High Figure of Merit Dispersion Compensating Fiber*, Technical Digest of OFC, 1996 at 350–355.

DISPERSION-COMPENSATING FIBER HAVING A HIGH RELATIVE DISPERSION SLOPE

CROSS-REFERENCE TO RELATED APPLICATION

This application is a continuation-in-part of co-pending U.S. application Ser. No. 09/790,105 entitled "Dispersion-Compensating Fiber Having A High Figure Of Merit," which was filed on Feb. 21, 2001.

TECHNICAL FIELD

This invention relates generally to improvements to optical fiber, and more particularly to the design of a dispersion-compensating fiber.

BACKGROUND OF THE INVENTION

Various mechanisms limit the bandwidth of an optical fiber. In a multimode optical fiber, for example, there is modal dispersion in which pulses of light that enter one end of the fiber are spread as they emerge from the other end of the fiber. This is because multimode fiber supports hundreds of different modes (or paths, if photons are viewed as particles rather than waves) as light propagates along the length of the fiber. Unfortunately, certain modes of consecutive pulses arrive at the distant end of the fiber at about the same time and interfere with each other. To avoid such intersymbol interference, the individual pulses of light in a multimode system are transmitted at a slower rate.

However, modal dispersion can be avoided with a fiber that is designed to support only the fundamental mode of a particular wavelength. Such a fiber is referred to as a singlemode fiber and has a much higher bandwidth than multimode fiber. But even here, a pulse of light that is introduced into one end of a singlemode fiber is somewhat spread in time as it emerges at the distant end. This is because the act of impressing information onto a single-wavelength lightwave (i.e., modulation) creates a spectrum of wavelengths that propagate along the fiber at different speeds. Accordingly, the different wavelength components (colors) that comprise the modulated lightwave arrive at the distant end of the fiber at different times, and the resulting pulse of light is "smeared" in time. Not surprisingly, this is referred to as chromatic dispersion.

A class of optical fibers has been developed that are known as dispersion-compensating (DC) fibers that, ideally, have dispersion characteristics that are opposite to the dispersion characteristics of the transmitting fiber. Reference is briefly made to FIG. 9, wherein curve 91 represents the chromatic dispersion of a known transmission fiber in the 1550 nanometers (nm) wavelength region. At this wavelength, the curve 91 shows that each kilometer (km) of fiber adds +17 ps (where, 1 Ps=$10^{-12}$ second) of dispersion of per nanometer of source spectral width. The positive (+) polarity merely indicates that wavelengths longer than 1550 nm travel more slowly than wavelengths that are shorter. For practical purposes, the polarity is meaningless. However, in order to compensate for this dispersion, a DC fiber is concatenated with the transmission fiber to add an equal but opposite amount of dispersion. Curve 92 represents the chromatic dispersion of a known DC fiber. At 1550 nm, this DC fiber provides −17 ps/nm·km of dispersion. Thus, if equal lengths of transmission fiber and DC fiber are concatenated, then the overall dispersion at 1550 nm will be zero. Unfortunately, wavelengths above and below 1550 nm will still experience a net amount of dispersion; and so a more desirable dispersion characteristic for a DC fiber is needed such as the one shown by curve 93, which not only has an opposite dispersion polarity with respect to the transmission fiber, but also has an opposite dispersion slope.

Indeed, for wavelength-division multiplexing (WDM) systems operating at 40 Gb/sec and above, it is necessary to compensate dispersion slope as well as dispersion polarity. Such compensation is achieved when the relative dispersion slope (RDS) of the DC fiber is equal to the RDS of the of the transmission fiber. RDS is defined as the dispersion slope divided by the dispersion (i.e., RDS=S/D). A recently developed, reduced-slope transmission fiber is disclosed in U.S. Pat. No. 5,878,182 which has a slope of only 0.045 ps/(nm$^2$·km) and a dispersion of +4.5 ps/(nm·km) to yield an RDS of 0.01 nm$^{-1}$ at 1550 nm. Such a fiber is commercially available from OFS Fitel as its TrueWave® RS optical fiber. Nevertheless, even this fiber requires compensation, but there does not appear to be any commercially available DC fiber with an RDS greater than 0.0035 nm$^{-1}$.

In optical transmission systems, dispersion compensation is achieved by splicing a length of DC fiber to the transmission fiber as generally illustrated in FIG. 7 and, for convenience, the DC fiber is stored in a module. It is important that the insertion loss of the dispersion-compensating module be as low as possible for a number of reasons including: simpler amplifier design; lower signal-to-noise ratio of the transmission system; and reduced nonlinear effects because input power to the dispersion compensating module can be lower. The insertion loss of a dispersion-compensating module has two major contributors: (i) splice loss at the junction between the transmission fiber and the DC fiber; and (ii) the loss of the DC fiber itself. The insertion loss of the module can be lowered by using a DC fiber having a high figure of merit, which is defined as the ratio of the magnitude of the dispersion to the attenuation of the DC fiber. Unfortunately, state-of-the-art DC fibers have figures of merit that are less than 200 ps/(nm·dB).

U.S. Pat. No. 5,361,319 (Antos) discloses a DC fiber and system in which dispersion is compensated by inserting modules at appropriate intervals. Each module contains DC fiber of an appropriate length to produce a dispersion of approximate equal magnitude (but opposite polarity) to that of the transmission fiber in the route. Unfortunately, the DC fibers shown in Antos have relatively small negative chromatic dispersion (absolute value ≦100 ps/nm·km; exemplarily −65 ps/nm·km), necessitating the use of long lengths of DC fiber (e.g., 39 km of DC fiber to compensate the dispersion of 150 km of transmission fiber). Furthermore, the Antos technique apparently is practical only for dispersion compensation, with dispersion slope compensation being considered "not easily achieved in practice" by the author.

U.S. Pat. No. 5,448,674 (Vengsarkar) discloses a DC fiber having relatively high dispersion (absolute value typically>150 ps/nm·km) and a negative dispersion slope, both of which represent substantial improvements over Antos. In order to achieve such results, Vengsarkar's DC fiber supports at least one higher order mode in addition to the fundamental LP mode ($LP_{01}$). The drawback is the complication of adding mode converters, which potentially adds to the loss. Another difficulty is that the fibers are multi moded, meaning that modal noise due to interference between the modes degrades the signal-to-noise ratio.

Accordingly, what is needed is a DC fiber having high dispersion, a negative dispersion slope, and a high RDS. Satisfying these multiple goals in a singlemode optical fiber is a long sought-after goal of DC fiber designers.

SUMMARY OF THE INVENTION

In a broad aspect, the invention is embodied in a singlemode optical fiber that compensates chromatic dispersion in an optical fiber communication system at an operating wavelength of about 1550 nm. This dispersion-compensating (DC) optical fiber is fabricated from silica glass and has a refractive index profile that includes a core region that is surrounded by a cladding region having a nominal refractive index $n_4$. The core region includes a central core having a nominal refractive index $n_1$, a "trench" surrounding the central core having a nominal refractive index $n_2$, and a "ridge" surrounding the trench having a nominal refractive index $n_3$. A range of refractive index profiles has been found that provides desirable DC fibers. The range is conveniently expressed in terms of index differences:

$0.015 < n_1 - n_4 < 0.035$;

$-0.012 < n_2 - n_4 < -0.006$; and $0.002 < n_3 - n_4 < 0.015$;

This range of refractive index differences together with the below range of radial dimensions have been found to provide exceptionally high values of RDS (i.e., greater than $0.012$ nm$^{-1}$):

central core: radius=1.5±0.5 $\mu$m;

trench: width=4.3±1.0 $\mu$m; and ridge: width=2.4±1.0 $\mu$m.

In illustrative embodiments of the invention, the DC fiber is wound on a spool that is contained within a DC module. By combining the DC fiber (e.g., splicing) end-to-end with a length of standard singlemode fiber, the RDS of the combined fibers is further increased.

In one illustrative embodiment, DC fiber according to the invention is used to compensate standard singlemode transmission fiber in an optical transmission system; and in another embodiment, DC fiber according to the invention is used to compensate non-zero dispersion shifted transmission fiber.

BRIEF DESCRIPTION OF THE DRAWING

The invention and its mode of operation will be more clearly understood from the following detailed description when read with the appended drawing in which.

TERMINOLOGY

The following definitions are in accord with common usage in the art:

Chromatic Dispersion—Disparity in values of group velocity for electromagnetic waves of differing wavelength—a linear effect (with amplitude linearly dependent on power), if uncompensated, constituting the major limitation on channel information capacity in singlemode fiber (on permitted bit rate as limited by pulse spreading due to differing velocities of pulse contained wavelengths).

Figure Of Merit (FOM)—the ratio formed by dividing the numerical value of the dispersion of an optical fiber by the attenuation of that fiber at a particular wavelength.

Non-Zero Dispersion Shifted Fiber (NZDF)—an optical fiber having a magnitude of dispersion (typically more than 0.8 ps/nm·km) at the contemplated operating wavelength, $\lambda_{op}$, of the fiber. Such a fiber is disclosed in U.S. Pat. No. 5,878,182 and is particularly advantageous in WDM systems Refractive Index Profile—the variation of the refractive index of an optical fiber as measured at different radial distances from the central axis of the fiber.

Relative Dispersion Slope (RDS)—the ratio formed by dividing the numerical value of the dispersion slope of an optical fiber by the dispersion of that fiber at a particular wavelength.

Ridge—annular region of increased refractive index in an optical fiber relative to adjacent interfacing regions.

Trench—annular region of reduced refractive index in an optical fiber relative to adjacent interfacing regions.

Unshifted Fiber (USF)—optical fiber for which the chromatic dispersion null point, $\lambda_0$, is at the nominal wavelength value of 1310 nm and whose dispersion at 1550 nm is about +17 ps/nm·km. USF is also referred to as Standard Singlemode Fiber.

W-shaped Profile—a refractive index profile comprising a central core, which is surrounded by a trench and an outer cladding. The magnitude of the trench's refractive index is less than that of either the central core or the cladding.

DETAILED DESCRIPTION

Figure 1:
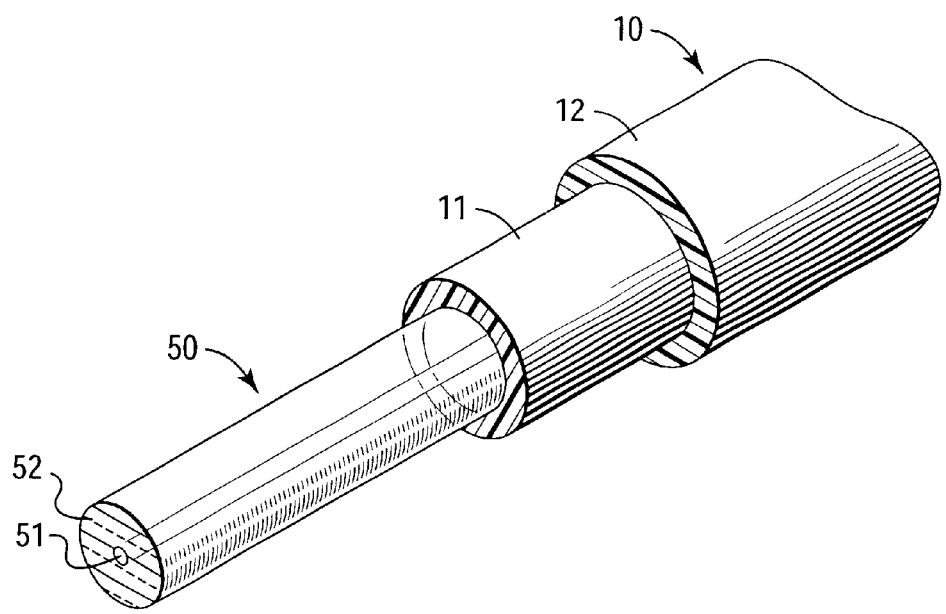
FIG. 1 is a perspective view of an optical fiber having two protective coating layers.

In the manufacture of optical fiber, a glass preform rod is suspended vertically and moved into a furnace at a controlled rate. The preform softens in the furnace and a glass fiber is drawn freely from the molten end of the preform rod by a capstan located at the base of a draw tower. (Even though the drawn fiber has a diameter that is thousands of times smaller than the preform rod, it has the same refractive index profile!) Because the surface of the glass fiber is susceptible to damage caused by abrasion, it is necessary to coat the fiber after it is drawn but before it comes into contact with any surface. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid by exposure to electromagnetic radiation. FIG. 1 discloses a dual-coated optical fiber 10, whose structure is suitable for use in the present invention. As shown, two layers of coating materials are applied to the drawn glass fiber 50, which comprises a light-carrying core region 51 surrounded by a cladding region 52. Glass fiber 50 has a diameter of about 125 $\mu$m. An inner layer 11, referred to as a primary coating material, is applied to the glass fiber 50; and an outer layer 12, referred to as a secondary coating material, is applied to the primary coating material 11. The secondary coating material generally has a relatively high modulus (e.g., $10^9$ Pa) to withstand handling, whereas the primary coating material has a relatively low modulus (e.g., $10^6$ Pa) to provide a cushion that reduces microbending losses. The secondary material may be applied while the primary coating is still wet, and then both coatings are simultaneously cured by radiation in the ultraviolet region of the electromagnetic spectrum.

Figure 2:
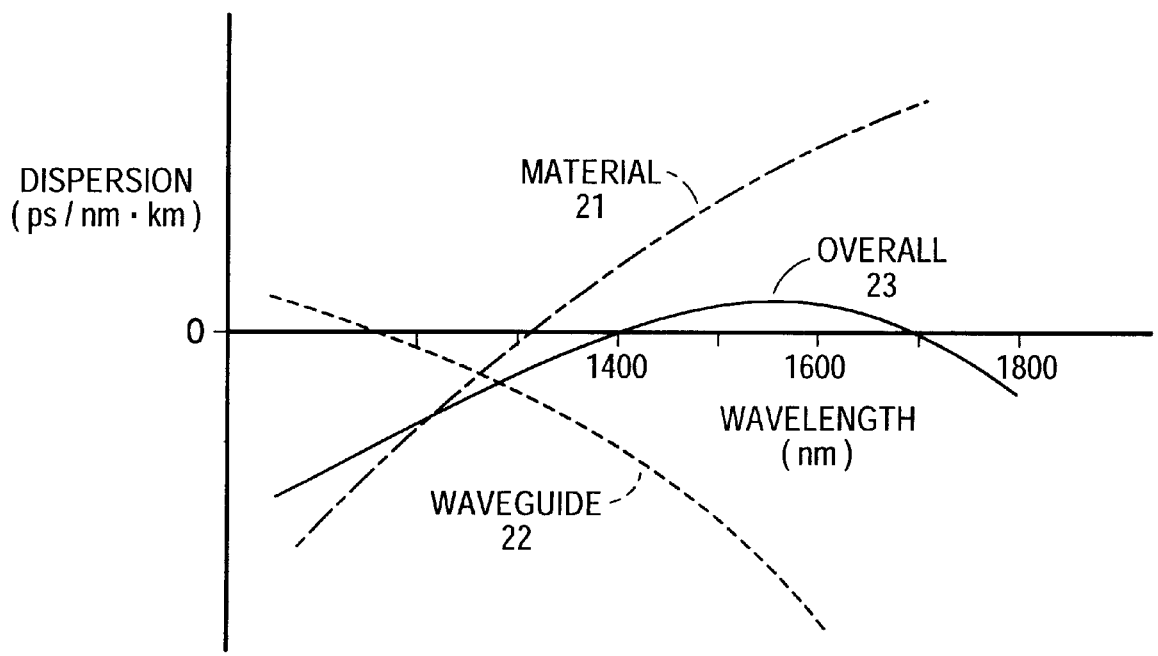
FIG. 2 is a graph of the dispersion characteristic of an optical fiber, as a function of wavelength, showing its material dispersion and waveguide dispersion components.

FIG. 2 illustrates the chromatic dispersion of an optical fiber and, more particularly, how an overall characteristic 23 is created through the additive combination of material and waveguide dispersion components. Material dispersion 21 is intrinsically associated with the specific materials (e.g., silica glass) used in making the optical fiber. Waveguide dispersion 22, on the other hand, is controlled by the refractive-index profile of the optical fiber, which is the variation of the refractive index of the silica glass, for example, as measured at different radial distances from the central axis of the fiber. Unlike material dispersion, waveguide dispersion can be shaped, within limits, by a design engineer to create a desired overall characteristic 23. Unfortunately, there are "side effects" associated with any particular overall characteristic, which is to say that changing waveguide dispersion 22 also changes other characteristics such as cut-off wavelength, bend loss, mode field diameter, etc. And that while one might be able design an optical fiber having any predetermined dispersion characteristic, the fiber might be quite useless based on practical considerations. For example, a bend-loss limit has been established as the point where bend loss at 1550 nm exceeds 0.01 dB/km for a bend radius of 75 millimeters. And while a particular refractive index profile might provide an otherwise desirable dispersion characteristic, it might also provide excessive bend loss, which would render it unacceptable.

Figure 3:
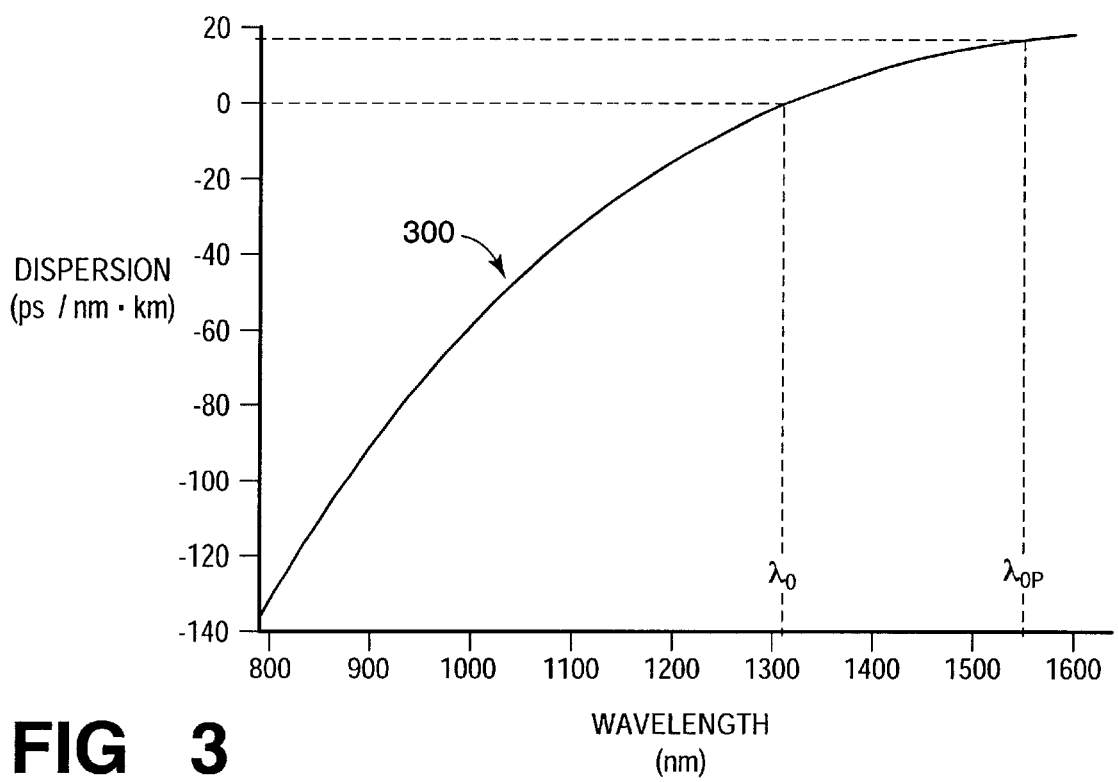
FIG. 3 is a graph of the dispersion characteristic of a standard (unshifted) singlemode optical fiber.

FIG. 3 shows the dispersion characteristic 300 of a dispersion-unshifted fiber (USF) such as covered by ITU Recommendation G.652. USF is the most widely used fiber type and is sometimes called "standard" singlemode fiber. It was introduced commercially in 1983. The composition of glass that is generally used in making optical fiber has zero dispersion at a wavelength $\lambda_0$ in the region of 1310 nm. But the theoretical minimum loss for a glass fiber is in the region of 1550 nm where the most practical fiber amplifier operates. (Erbium-doped fiber is used to amplify optical signals having wavelengths in the 1530–1565 nm region where there is a transition in the $Er^{3+}$ dopant ion.) Because of the desirability of operating in the 1550 nm region and the large number of already-installed systems having standard singlemode fiber, engineers designed a dispersion-compensating (DC) fiber to be connected in series with such fiber in order to cancel dispersion at 1550 nm. As a practical matter, a suitable length of DC fiber was wrapped around a spool to form a DC module and then spliced to a transmission fiber at regular intervals. Depending on the length of these intervals, an optical amplifier might or might not be included in the DC module. Nevertheless, DC fiber is not exclusively used with standard singlemode fiber, but is used with any fiber where dispersion exists at the operating wavelength $\lambda_{op}$.

Figure 4:
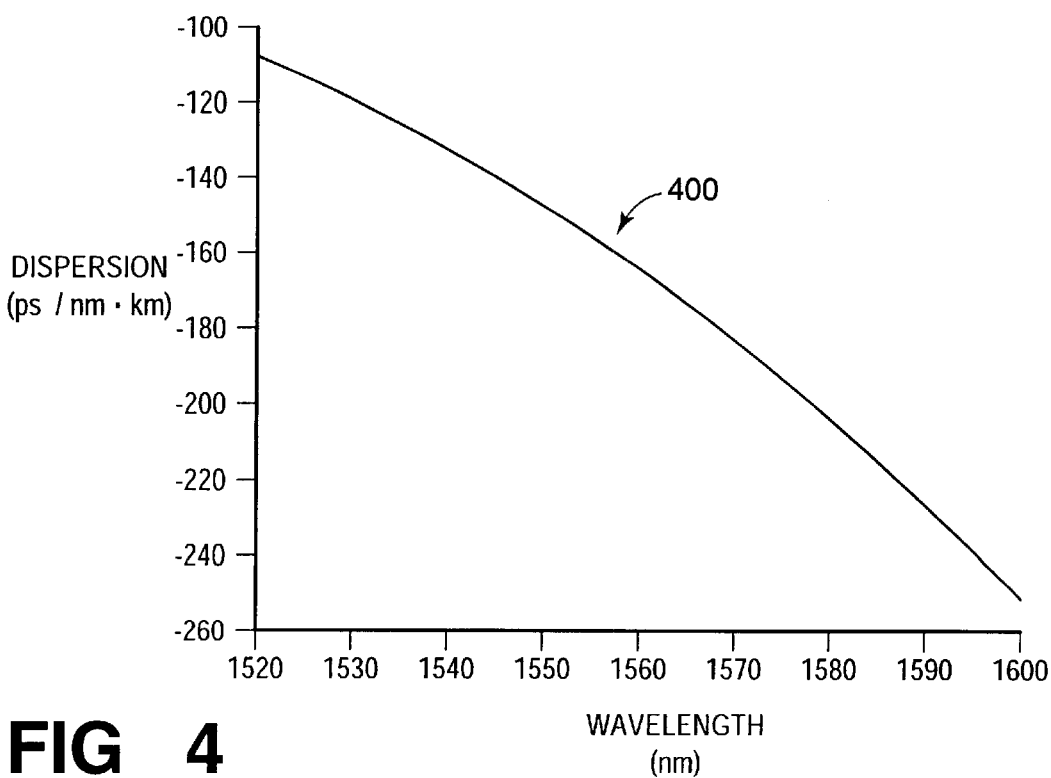
FIG. 4 is a graph of the typical dispersion characteristic of a DC fiber in accordance with the present invention.

FIG. 4 shows the overall dispersion characteristic 400 of a DC fiber in accordance with the present invention. In particular, the significant amount of negative dispersion that is available in the C and L bands of optical transmission (1530–1610 nm) is quite desirable. Moreover, its negative dispersion slope in this wavelength region is well suited to compensate the positive dispersion slope of most transmission fibers (see e.g., FIG. 3). As discussed in connection with FIG. 2, the overall dispersion characteristic of a fiber, including the DC fiber of the present invention, is the combination of material dispersion and waveguide dispersion; and waveguide dispersion is determined by the refractive-index profile. Accordingly, what follows below is a discussion of the refractive-index profiles that combine with the material dispersion characteristic of silica glass to produce the DC fiber in accordance with the present invention.

Figure 5:
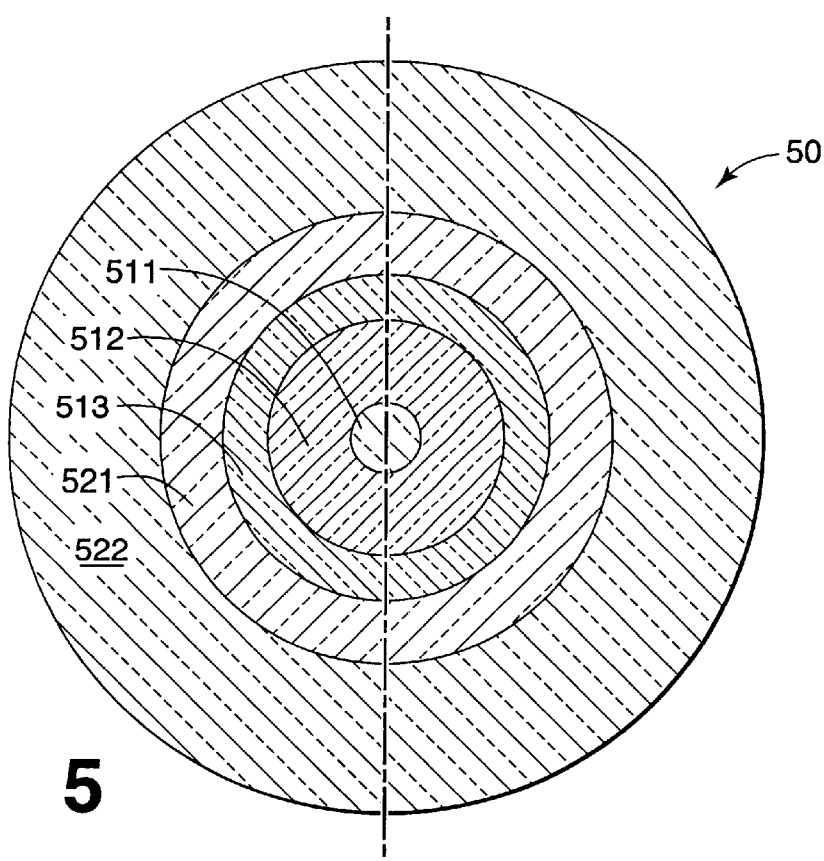
FIG. 5 is a cross-section view of an uncoated optical fiber showing several layers of different refractive index materials.
Figure 6:
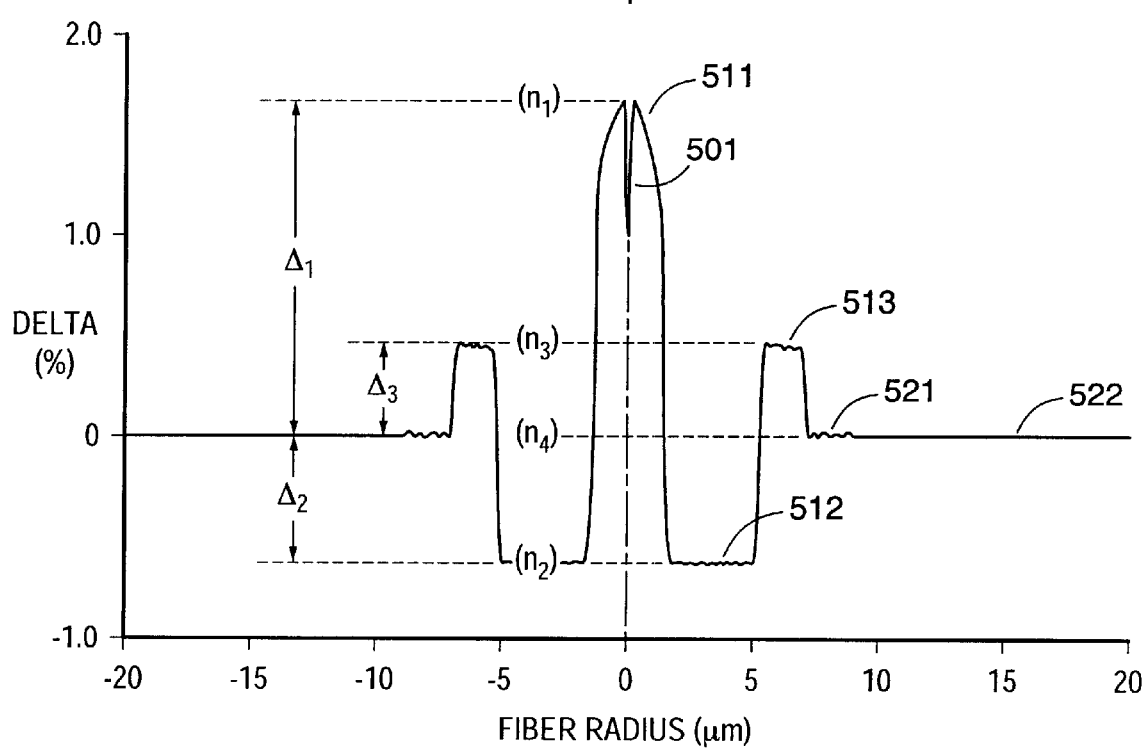
FIG. 6 discloses a refractive-index profile of a DC fiber in accordance with the present invention.

Reference is made to FIG. 5, which generally discloses a cross section of an uncoated glass fiber 50 showing a plurality of layers 511, 512, 513, 521, 522—each having a different index of refraction for modifying the waveguide dispersion characteristic of the fiber. And while FIG. 5 suggests that the refractive index remains perfectly constant in the radial direction between abrupt level changes, this is not the case for a manufacturable fiber. Indeed, FIG. 6 shows an actual refractive index profile of a DC fiber in accordance with the present invention. Initially it is noted that the index of refraction dips at the geometric center of the central core 511 (i.e., where the fiber radius r=0). The dip 501 in refractive index is an aberration that is normally attributable to the particular manufacturing process used. For example, the dip shown in FIG. 6 is attributable to the modified chemical vapor deposition (MCVD) process, which was illustratively used to fabricate the DC fiber of the present invention. Nevertheless, the dip 501 does not adversely affect the transmission properties of the resulting DC fiber since it is relatively narrow, and can even be shaped to desirably modify the light-carrying characteristics of the fiber.

Desirable DC fiber qualities include: negative dispersion and slope, high RDS and high FOM. These fiber qualities are achieved at a predetermined wavelength by the appropriate selection of refractive index profile. In the present invention, the fiber is fabricated from silica glass and has a refractive index profile that includes a core region surrounded by an outer cladding region having a nominal refractive index $n_4$. The core region comprises a central core 511 having a nominal refractive index $n_1$, a "trench" 512 surrounding the central core having a nominal refractive index $n_2$, and a "ridge" 513 surrounding the trench having a nominal refractive index $n_3$. An inner layer of deposited cladding material 521 of nominal refractive index $n_4$ surrounds the ridge 513. An inner layer of deposited cladding is useful for protecting the core region 511–513 from impurities in the outer cladding 522 migrating into the core region and adversely affecting its light-carrying properties. Illustratively, the outer cladding 522 may be a relatively impure glass tube that is jacketed onto a relatively pure core region using well known rod-in-tube technology. It is noted that the drawing of FIG. 5 is not to scale since the diameter of outer cladding layer 522 is about 125 microns, while the diameter of the core region 511–513 is less than 15 microns.

Three example profiles are disclosed below that provide a DC fiber having desirable properties. Each profile includes five layers:

1. A central core, which is a raised index region generally consisting $SiO_2$ doped with the appropriate amount of $GeO_2$ to achieve the desired index.
2. A trench surrounding the core that is a depressed index region composed of $SiO_2$ doped with the appropriate amount of $GeO_2$ and F to achieve the desired index.
3. A ridge surrounding the trench that is a raised index region composed of $SiO_2$ doped with the appropriate amount of $GeO_2$ and F to achieve the desired index.
4. An inner layer of deposited cladding surrounding the ridge. It is a region with the same index of refraction as the outer cladding that has no influence on the transmission properties, but reduces the splice loss of the fiber. The deposited cladding is generally composed of $SiO_2$ doped with that appropriate amount of $P_2O_5$ and F.
5. An outer cladding composed of $SiO_2$.

EXAMPLE A

| Region | Dimension | Index Difference to Outer Cladding (Δn) | Δ = Δn/$n_i$ × 100% |
|---|---|---|---|
| Central Core | Radius = 1.36 μm | 25 × 10$^{-3}$ | 1.70% |
| Trench | Width = 3.10 μm | −9 × 10$^{-3}$ | −0.61% |
| Ridge | Width = 2.0 μm | 6 × 10$^{-3}$ | 0.41% |
| Inner Cladding | Width = 1.8 μm | 0 | 0 |
| Outer Cladding | Radius = 62.5 μm | 0 | 0 |

EXAMPLE B

| Region | Dimension | Index Difference to Outer Cladding (Δn) | Δ = Δn/$n_i$ × 100% |
|---|---|---|---|
| Central Core | Radius = 1.36 μm | 25 × 10$^{-3}$ | 1.70% |
| Trench | Width = 3.14 μm | −9 × 10$^{-3}$ | −0.61% |
| Ridge | Width = 2.0 μm | 6 × 10$^{-3}$ | 0.41% |
| Inner Cladding | Width = 1.8 μm | 0 | 0 |
| Outer Cladding | Radius = 62.5 μm | 0 | 0 |

EXAMPLE C

| Region | Dimension | Index Difference to Outer Cladding (Δn) | Δ = Δn/$n_i$ × 100% |
|---|---|---|---|
| Central Core | Radius = 1.34 μm | 25 × 10$^{-3}$ | 1.70% |
| Trench | Width = 3.88 μm | −9 × 10$^{-3}$ | −0.61% |
| Ridge | Width = 1.8 μm | 6 × 10$^{-3}$ | 0.41% |
| Inner Cladding | Width = 1.8 μm | 0 | 0 |
| Outer Cladding | Radius = 62.5 μm | 0 | 0 |

Ultranegative Refractive Index Depression

In all of the above examples, the refractive index of the trench is considerably more negative (i.e., Δ$^-$>0.5%) than known DC fibers. Such levels are required to decrease or eliminate core GeO$_2$ content and provide greater design flexibility for DC fibers. Modified Chemical Vapor Deposition (MCVD) is illustratively used in the present invention and previously, Δ$^-$ magnitudes greater than 0.5% from Fluorine-doping have been achieved at low deposition efficiencies in standard MCVD. Preforms were fabricated using a two-step process in which soot layers were fabricated with SiCl$_4$, O$_2$ and, optionally, He at 1700° C. or 1800° C. and then sintered in flowing SiF$_4$ at 2200° C. or 2350° C. for torch velocities from 15 to 140 mm/min. Details regarding this process are disclosed in Ultranegative delta cladding for modified chemical vapor deposition in the *Digest of Optical Fiber Communications Conference*, OFC '96, paper TuL1, pp. 56–57 by A. E. Miller et al., which is hereby incorporated by reference. By optimizing process conditions at a high SiO$_2$ processing rate, a low Δ$^-$ of 0.71% has been achieved.

Relative Dispersion Slope (RDS)

For multi-channel high-speed WDM systems, dispersion compensation in a broad wavelength range is necessary. This means that in addition to dispersion polarity, it is also necessary to compensate for dispersion slope. The condition for simultaneous dispersion and slope compensation is that the relative dispersion slope (RDS) of the dispersion-compensating fiber equals the RDS of the of the compensated fiber. RDS is defined as the dispersion slope divided by the dispersion. NZDF fibers have higher RDS than non-shifted singlemode fibers due to their low dispersion. As discussed above, OFS Fitel's TrueWave RS fiber has a slope of 0.045 ps/(nm$^2$·km) and a dispersion of +4.5 ps/(nm·km) yielding an RDS of 0.01 nm$^{-1}$ at 1550 nm—the lowest RDS of any commercially available NZDF.

The following table summarizes measured transmission properties for the three example fibers realized above:

| Transmission Properties Of Realized Fibers With High FOM | | | | |
|---|---|---|---|---|
| | Units | Fiber A | Fiber B | Fiber C |
| RDS at 1550 nm | nm$^{-1}$ | 0.001 | 0.0036 | 0.0094 |
| Dispersion at 1550 nm | ps/(nm · km) | −205 | −185 | −190 |
| Attenuation at 1550 nm | dB/km | 0.57 | 0.58 | 0.62 |
| FOM at 1550 nm | ps/(nm · dB) | 360 | 320 | 310 |
| 1 dB/km wavelength | nm | 1680 | 1690 | 1605 |
| Mode field diameter at 1550 nm | μm | 5.1 | 4.9 | 4.7 |
| Cut-off wavelength | nm | 1500 | 1530 | 1500 |

Fiber A has a record high FOM but a low RDS. Such a fiber is particularly useful in reducing the amount of DC fiber needed to compensate a length of transmission fiber. The high FOM means that the insertion loss associated with a DC module will be low.

Fiber B has an RDS that provides excellent slope compensation for standard singlemode transmission fiber. Compared to previously realized DC fibers for slope compensation of such transmission fiber, fiber B has a 60% higher FOM.

Fiber C has a RDS that provides 94% slope compensation for OFS Fitel's TrueWave RS optical fiber, discussed above, which is a popular non-zero dispersion fiber (NZDF). Compared with previously realized DC fibers for full slope compensation of NZDF at 1550 nm, fiber C has improved bend loss performance, which makes this DC fiber particularly suitable for use in Erbium doped fiber amplifiers. Fiber C has a 100% higher FOM than the previously realized fiber.

By the suitable selection of radii and refractive indices, the chromatic dispersion characteristic of a DC fiber can be designed to provide a high magnitude of negative dispersion, negative dispersion slope, and a high figure of merit in the wavelength range 1530–1610 nm. These dimensions and refractive indices are summarized below. For convenience, delta (Δ) values and normalized Δ values are provided because of their familiarity among design engineers in this art:

Suitable Core Rod Design Parameters With High FOM

| Region | Dimension | Index Difference to Outer Cladding (Δn) | $\Delta_i = \Delta n/n_i \times 100\%$ |
|---|---|---|---|
| Central Core | Radius = 1.5 ± 0.5 μm | $0.015 < n_1 - n_4 < 0.035$ | $1.0\% \leq \Delta_1 \leq 2.4\%$ |
| Trench | Width = 3.5 ± 1.0 μm | $-0.012 < n_2 - n_4 < -0.006$ | $-0.71\% \leq \Delta_2 \leq -0.4\%$ |
| Ridge | Width = 2.0 ± 1.0 μm | $0.002 < n_3 - n_4 < 0.015$ | $0.13\% \leq \Delta_3 \leq 1.0\%$ |
| Inner Cladding | Width = 0.0 – 5.0 μm | 0 | 0 |

Detailed descriptions of procedures for fabricating optical preforms are readily available. Preforms may be monolithic or composite. A core rod comprising the core region (central core, trench, ridge) and the inner cladding layer are preferably formed by Modified Chemical Vapor Deposition (MCVD) or by one of the processes using soot chemistry—e.g., Outside Vapor Deposition or Vapor Axial Deposition. The outer cladding preferably comprises an undoped silica tube that is jacketed onto the core rod. MCVD fabrication of preforms and jacketing procedures are well known in the art and, for brevity, are not repeated in this specification.

Increased Relative Dispersion Slope (RDS)

A new type of DC fiber with significantly higher RDS than previously reported has been developed. Its refractive index profile is generally shown in FIG. 6, but the exact dimensions are disclosed in Examples D, E and F below. It has been found that by slightly increasing the width of the trench and the ridge of Examples A, B and C, that significantly higher RDS can be achieved in a DC fiber in addition to a high FOM.

EXAMPLE D

| Region | Dimension | Index Difference to Outer Cladding (Δn) | $\Delta = \Delta n/n_i \times 100\%$ |
|---|---|---|---|
| Central Core | Radius = 1.40 μm | $24.6 \times 10^{-3}$ | 1.67% |
| Trench | Width = 4.27 μm | $-8.9 \times 10^{-3}$ | -0.61% |
| Ridge | Width = 2.35 μm | $5.7 \times 10^{-3}$ | 0.39% |
| Inner Cladding | Width = 1.43 μm | $0.7 \times 10^{-3}$ | 0.05% |
| Outer Cladding | Radius = 62.5 μm | 0 | 0 |

EXAMPLE E

| Region | Dimension | Index Difference to Outer Cladding (Δn) | $\Delta = \Delta n/n_i \times 100\%$ |
|---|---|---|---|
| Central Core | Radius = 1.37 μm | $24.6 \times 10^{-3}$ | 1.67% |
| Trench | Width = 4.27 μm | $-8.9 \times 10^{-3}$ | -0.61% |
| Ridge | Width = 2.38 μm | $5.6 \times 10^{-3}$ | 0.381% |
| Inner Cladding | Width = 1.43 μm | $0.7 \times 10^{-3}$ | 0.05% |
| Outer Cladding | Radius = 62.5 μm | 0 | 0 |

EXAMPLE F

| Region | Dimension | Index Difference to Outer Cladding (Δn) | $\Delta = \Delta n/n_i \times 100\%$ |
|---|---|---|---|
| Central Core | Radius = 1.34 μm | $24.6 \times 10^{-3}$ | 1.65% |
| Trench | Width = 4.19 μm | $-8.8 \times 10^{-3}$ | -0.60% |
| Ridge | Width = 2.33 μm | $5.6 \times 10^{-3}$ | 0.38% |
| Inner Cladding | Width = 1.40 μm | $0.6 \times 10^{-3}$ | 0.04% |
| Outer Cladding | Radius = 62.5 μm | 0 | 0 |

Transmission Properties of Realized Fibers With High RDS

| Transmission Properties Of Realized Fibers With High RDS | | | | |
|---|---|---|---|---|
| | Units | Fiber D | Fiber E | Fiber F |
| RDS at 1550 nm | $nm^{-1}$ | 0.0157 | 0.0182 | 0.0208 |
| Dispersion at 1550 nm | ps/(nm · km) | -134 | -173 | -213.5 |
| Attenuation at 1550 nm | dB/km | 0.604 | 0.61 | 0.715 |
| Polarization Mode Dispersion | ps/km½ | 0.11 | 0.10 | 0.266 |
| FOM at 1550 nm | ps/(nm · dB) | 222 | 284 | 299 |
| 1 dB/km wavelength | nm | 1600 | 1575 | 1570 |
| Mode field diameter at 1550 nm | μm | 4.51 | 4.38 | 4.38 |
| Cut-off wavelength | nm | 1580 | 1498 | 1527 |

It is noted that the cut-off wavelength (the wavelength above which only one mode is guided) of 1580 is observed for Fiber D. The fiber is intended for use in the C-band between 1530 and 1570 nm. In general, it is desirable that the cut-off wavelength is below the operating bandwidth of the fiber. This is to assure singlemode operation (only one guided mode in the fiber) thereby avoiding any signal degeneration due to interference between different guided modes. However, the 1580 nm cut-off is measured using the standard measurement method on 2 meters of fiber. For this fiber, the cut-off wavelength decreases for decreased bend radius and increased fiber length. When, for example, the fiber is wound around a mandrel whose diameter is 165 mm, it is observed that after only four (4) turns the cut-off wavelength is below 1525 nm. That means for practical DC modules, whose bend diameters are smaller, the fiber will be single moded.

Suitable Core Rod Design Parameters With High RDS

| Region | Dimension | Index Difference to Outer Cladding ($\Delta n$) | $\Delta_i = \Delta n/n_i \times 100\%$ |
|---|---|---|---|
| Central Core | Radius = 1.5 ± 0.5 μm | $0.015 < n_1 - n_4 < 0.035$ | $1.0\% \leq \Delta_1 \leq 2.4\%$ |
| Trench | Width = 4.3 ± 1.0 μm | $-0.012 < n_2 - n_4 < -0.006$ | $-0.71\% \leq \Delta_2 \leq -0.4\%$ |
| Ridge | Width = 2.4 ± 1.0 μm | $0.002 < n_3 - n_4 < 0.015$ | $0.13\% \leq \Delta_3 \leq 1.0\%$ |
| Inner Cladding | Width = 0.0 – 5.0 μm | 0 | 0 |

RDS is further increased when combined (e.g., spliced end-to-end) with standard singlemode optical fiber in a DC module. For example, when the DC module comprises from 25 to 35 percent DC Fiber, such as shown in Example D, and from 65 to 75 percent standard singlemode fiber, the overall dispersion and RDS of the DC module provides excellent slope and dispersion compensation for Corning's ELEAF fiber. This situation is discussed in greater detail below.

Figure 7:
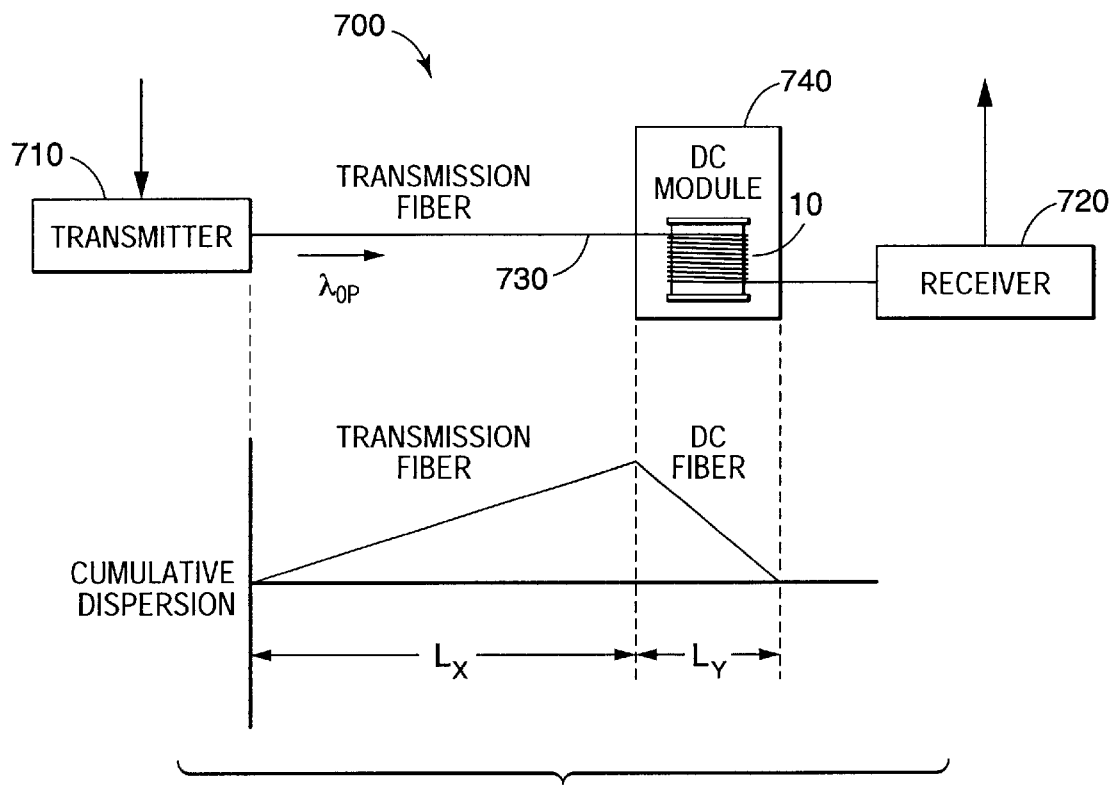
FIG. 7 discloses an optical transmission system that includes transmission fiber spliced to a length of DC fiber in accordance with the present invention.

FIG. 7 discloses an optical fiber system 700, which includes a span of optical transmission fiber 730, an optical transmitter 710, and a receiver 720. The span is constructed by splicing a first predetermined length $L_x$ of transmission fiber 730 to a second predetermined length $L_y$ of DC fiber 10. Transmitter 710 launches light at an operating wavelength, $\lambda_{op}$, into a transmission fiber 730 having positive dispersion. However, after traveling distance $L_x$, an amount of positive dispersion has accumulated and a DC module 740 of optical fiber is introduced that has negative dispersion at $\lambda_{op}$. This module typically comprises a length $L_y$ of DC fiber 10 that is shorter than $L_x$. By adding a length of DC fiber, additional loss is introduced which, together with the loss introduced by transmission fiber 730, must be dealt with by the receiver 720 or an amplifier (not shown) that is associated with the module 740. The need for such a system has largely been driven by the desire to upgrade existing optical networks, which presently operate at 1310 nm, to operate at 1550 nm in order to increase their capacity. (It is noted that transmission fiber which normally operates at 1310 nm has about +17 ps/nm·km of dispersion at 1550 nm, and so it is necessary to introduce an equal but opposite amount of dispersion at 1550 nm to achieve compensation.) In a first illustrative embodiment, the transmission fiber 730 comprises 100 km of standard singlemode fiber whose dispersion characteristic is shown in FIG. 3.

In this first embodiment, standard singlemode fiber is used as the transmission fiber and dispersion compensation is accomplished via DC module 740 containing about 9 km of DC fiber 10, whose typical dispersion characteristic is shown in FIG. 4. The attenuation associated with 100 km of transmission fiber 730 is about 20 dB and the attenuation associated with 9 km of DC fiber 10 plus associated splicing loss is less than 7 dB. In a preferred embodiment of the invention, the DC module 740 further includes amplification means such as an Erbium doped fiber amplifier (EDFA) or apparatus for reverse pumping the DC fiber itself with optical energy at different wavelength(s) to achieve Raman amplification in the manner disclosed in U.S. patent application Ser. No. 09/634,966, which was filed on Aug. 9, 2000.

Figure 8:
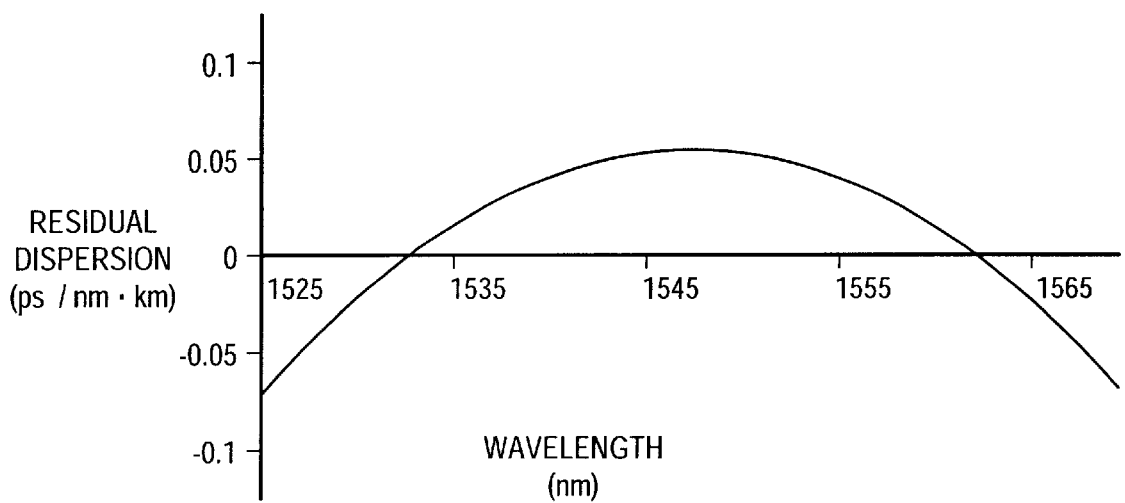
FIG. 8 is a graph showing the measured residual dispersion in the optical transmission system of FIG. 7 when a NZDF transmission fiber is compensated by a DC fiber in accordance with the present invention.
Figure 9:
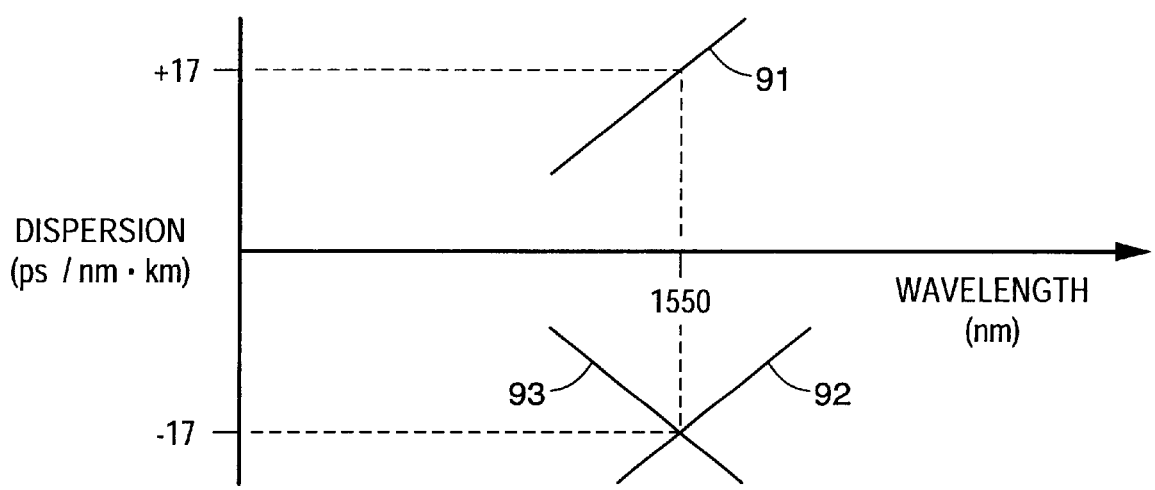
FIG. 9 is a graph that illustrates chromatic dispersion, as a function of wavelength, for a known transmission fiber and for two different DC fibers.

In a second illustrative embodiment, the transmission fiber 730 comprises a nominal length 100 km of Non Zero Dispersion Fiber (NZDF) such as OFS Fitel's TrueWave RS fiber. This fiber is discussed above and has a nominal dispersion of +4.5 ps/(nm·km) and a nominal slope of +0.045 ps/(nm²·km) at 1550 nm. A length of DC fiber 10 corresponding to Example 3 above is wound on a spool to form DC module 740 having a total dispersion of −452 ps/nm. The RDS of the DC module at 1550 nm was 0.0095 nm⁻¹. A short length of intermediate fiber (not shown) is inserted between the DC fiber 10 and transmission fiber 730 in order to lower the splice loss. Reduced-loss splicing techniques between the transmission fiber and the DC fiber are disclosed in application Ser. No. 09/778,444 and application Ser. No. 09/778,413, which were both filed on Feb. 7, 2001 and are both hereby incorporated by reference. Actual measured values at 1550 nm of dispersion magnitude and slope for transmission fiber 730 were +4.5 ps/(nm·km) and 0.044 ps/(nm²·km) respectively, yielding an RDS value of 0.0092 nm⁻¹. The actual length of the transmission fiber is 96 km giving a total dispersion of 458 ps/nm. The measured residual dispersion of this second illustrative embodiment is shown in FIG. 8. Note that the residual dispersion varies only ±0.04 ps/(nm·km) in the C-band.

In a third illustrative embodiment of the invention, the transmission fiber 730 comprises 100 km of NZDF such as Corning's ELEAF fiber. In this embodiment, DC fiber 10 comprises 4288 meters of DC fiber of the type disclosed in Example D spliced together with 9467 meters of standard singlemode fiber. Together, they provide DC module 740 with a total dispersion of about −420 ps/nm and an RDS of about 0.020 nm⁻¹ at 1550 nm—thereby providing full slope and dispersion compensation.

Although various particular embodiments of the present invention have been shown and described, modifications are possible within the scope of the invention. For example, it is understood that the DC fiber of the present invention can be used to compensate transmission fibers other than standard singlemode fiber.

What is claimed is:

1. An article comprising a length of dispersion-compensating (DC) optical fiber that is designed to support only the fundamental mode of radiation at 1550 nm, the DC fiber being fabricated from silica glass and having a refractive index profile that includes a core region surrounded by a cladding region having a nominal refractive index $n_4$, the core region comprising:

a central core having a nominal refractive index $n_1$;

a "trench" surrounding the central core, the trench having a nominal refractive index $n_2$, and a "ridge" surrounding the trench, the ridge having a nominal refractive index $n_3$ wherein:

$0.015 < n_1 - n_4 < 0.035$;

$-0.012 < n_2 - n_4 < -0.006$;

$0.002 < n_3 - n_4 < 0.015$; and wherein the core region comprises the following dimensions:

central core radius = 1.5 ± 0.5 μm;

trench width = 4.3 ± 1.0 μm;

ridge width = 2.4 ± 1.0 μm.

2. The article of claim 1 wherein the DC fiber has a non-zero dispersion (D) and a non-zero dispersion slope (S) at 1500 nm, and wherein the ratio of the dispersion slope to the dispersion (S/D) is greater than 0.012 nm⁻¹ at 1550 nm.

3. The article of claim 2 further including an annular ring of deposited cladding material disposed between the ridge and the outer cladding, said deposited cladding having a width of at least 1.0 micron and an index of refraction that is approximately equal to $n_4$.

4. The article of claim 1 wherein the DC fiber has negative dispersion, insertion loss and a refractive index profile that provides a dispersion characteristic having an RDS that is greater than 0.015 $nm^{-1}$ at 1550 nm; and the ratio of the dispersion to the insertion loss at 1550 nm forms a Figure Of Merit (FOM) whose absolute magnitude exceeds 200 ps/(nm·dB).

5. The article of claim 1 wherein the DC fiber has negative dispersion, insertion loss, and a refractive index profile that provides a dispersion characteristic having an RDS that is greater than 0.018 $nm^{-1}$ at 1550 nm; and the ratio of the dispersion to the insertion loss at 1550 nm forms a Figure Of Merit (FOM) whose absolute magnitude exceeds 250 ps/(nm·dB).

6. The article of claim 1 wherein the DC fiber has negative dispersion, insertion loss and a refractive index profile that provides a dispersion characteristic having an RDS that is greater than 0.02 $nm^{-1}$ at 1550 nm; and the ratio of the dispersion to the insertion loss at 1550 nm forms a Figure Of Merit (FOM) whose absolute magnitude exceeds 280 ps/(nm·dB).

7. The article of claim 1 wherein the DC fiber is fabricated by a Modified Chemical Vapor Deposition process.

8. The article of claim 1 wherein:

the central core comprises $SiO_2$ doped with an appropriate amount of $GeO_2$ to achieve the nominal refractive index $n_1$;

the trench surrounding the central core comprises $SiO_2$ doped with an appropriate amount of $GeO_2$ and F to achieve the nominal refractive index $n_2$; and the ridge surrounding the trench comprising $SiO_2$ doped with the appropriate amount of $GeO_2$ and F to achieve the nominal refractive index $n_3$.

9. The article of claim 8 wherein the cladding region includes inner and outer layers of silica glass, the inner layer being adjacent to the ridge and comprising $SiO_2$ doped with $P_2O_5$ and F.

10. The article of claim 1 wherein the length of DC fiber is stored in a module.

11. The article of claim 10 wherein the length of DC fiber is spliced end-to-end with a length of a standard singlemode fiber.

12. The article of claim 11 wherein the length of DC fiber comprises at least 25 percent of the length of the total fiber on the module.

* * * * *